(12) United States Patent
Jensen et al.

(10) Patent No.: US 11,754,317 B2
(45) Date of Patent: Sep. 12, 2023

(54) LIQUID HEATING AND STORAGE APPARATUS

(71) Applicant: Rheem Australia PTY Limited, Rydalmere (AU)

(72) Inventors: Jim Jensen, Rydalme (AU); Momtiaz Zraika, Rydalme (AU)

(73) Assignee: Rheem Australia Pty Limited, Rydalmere (AU)

( * ) Notice: Subject to any disclaimer, the term of this patent is extended or adjusted under 35 U.S.C. 154(b) by 36 days.

(21) Appl. No.: 17/609,169

(22) PCT Filed: May 5, 2020

(86) PCT No.: PCT/AU2020/050443
§ 371 (c)(1),
(2) Date: Nov. 5, 2021

(87) PCT Pub. No.: WO2020/223760
PCT Pub. Date: Nov. 12, 2020

(65) Prior Publication Data
US 2022/0228773 A1    Jul. 21, 2022

(30) Foreign Application Priority Data

May 9, 2019 (AU) ............................... 2019901576

(51) Int. Cl.
*F24H 8/00* (2022.01)
*F24H 9/17* (2022.01)
*F24H 1/20* (2022.01)

(52) U.S. Cl.
CPC ............. *F24H 8/006* (2013.01); *F24H 1/205* (2013.01); *F24H 9/17* (2022.01)

(58) Field of Classification Search
CPC ..... F24H 1/18; F24H 8/00; F24H 9/16; F24H 8/006; F24H 1/36; F24D 19/08; F24D 19/082; F24D 19/088; F22B 9/04; F22B 13/02
See application file for complete search history.

(56) References Cited

U.S. PATENT DOCUMENTS

| 4,372,290 A * | 2/1983 | Visos | F23D 14/06 431/119 |
| 8,161,918 B2 * | 4/2012 | Ma | F24H 1/205 122/15.1 |
| 2017/0059203 A1 * | 3/2017 | Kim | F24H 9/13 |

FOREIGN PATENT DOCUMENTS

WO    WO-2015194785 A1 *  12/2015  ............... F24H 1/18

* cited by examiner

*Primary Examiner* — Gregory A Wilson
(74) *Attorney, Agent, or Firm* — Eversheds Sutherland (US) LLP

(57) ABSTRACT

A condensate collector (40) for use in water heating apparatus (10). The apparatus (10) includes a liquid storage tank (12), a combustion chamber (20), a flue (26) disposed above the combustion chamber (20), and, a condensate collector (40). The condensate collector (40) includes a receptacle (42) positioned in an entry end (28) of the flue (26), a discharge outlet (53) for discharging condensate collected in the receptacle (42) for subsequent transfer to a drain.

20 Claims, 8 Drawing Sheets

LIQUID HEATING AND STORAGE APPARATUS

CROSS REFERENCE TO RELATED APPLICATION

This application is a National Stage Entry of, and claims priority to, PCT Patent Application No. PCT/AU2020/050443 which was filed on 5 May 2020, which claims priority to and the benefit of Australian Patent Application No. 2019901576, which was filed on 9 May 2019. The entire contents and substance of the aforementioned applications are hereby incorporated by reference in their entireties as if fully set forth herein.

TECHNICAL FIELD

This disclosure relates generally to liquid heating and storage apparatus and components therefor. One particular application concerns gas fired water heaters. It is to be understood however that reference to this particular application is not to be taken as a limitation as to the scope of the disclosure.

BACKGROUND ART

Gas fired water heaters typically comprise a storage tank for holding the water to be heated, a combustion chamber having a burner therein for heating the water within the storage tank and a flue tube for discharging the combustion gases from the combustion chamber. Under certain operating conditions moisture or condensation can form inside the flue tube as a result of the combustion process. The condensate generally forms on an inner surface of the flue tube and tends to flow back into the combustion chamber. When the condensate evaporates inside the combustion chamber the vapour travels into the flue tube and as a result reduces the volume available for the combustion gases therein. Flue tubes are often provided with baffling to assist in the heat transfer process in the flue with the passage of the combustion gases there through. The existence of vapour within the flue can mean that the baffling will be less effective thereby reducing the performance of the water heater.

SUMMARY OF DISCLOSURE

In a first aspect embodiments are disclosed of a condensate collector which is suitable for use in apparatus for heating and storing liquid, the apparatus comprising: a liquid storage tank a combustion chamber adjacent a lower end of the liquid storage tank, a flue having an entry and an exit end, the flue being disposed above the combustion chamber and in fluid communication therewith, and the condensate collector includes a receptacle which in use is in the region of the entry end of the flue, a discharge outlet for discharging condensate collected in the receptacle for subsequent transfer to a drain.

The arrangement is such that, if during the combustion process condensate forms within the flue, the condensate will flow towards the flue entry end into the condensate collector receptacle whereafter, it can flow from the discharge outlet to a drain. As a result of this arrangement, the dispersal of condensate within the combustion chamber is reduced. By limiting the amount of condensate within the combustion chamber, the performance of the apparatus is improved. For example, the arrangement enables the flue to have more baffling therein.

In certain embodiments the receptacle comprises a generally annular shaped channel having a base, an inner side wall, an outer peripheral side wall and an open top side. In certain embodiments the inner side wall has a height from the base to the top side which is greater than that of the outer side wall. In certain embodiments, when in use the open top side is disposed adjacent or partially within the entry end of the flue, the flue comprising a flue tube, having an inner side at the entry end, and the open top side is substantially aligned with the inner side.

In certain embodiments the condensate collector further includes a mounting bracket for mounting the collector within the combustion chamber. In certain embodiments the collector further includes a transfer conduit having one end operatively connected to the discharge outlet and the other end operatively connected to a drain. In certain embodiments the transfer conduit comprises a first arm and a second arm arranged end to end, the first arm being disposed adjacent a side wall of the combustion chamber and being in operative communication with the drain and the second arm extending from the first arm and being in operative connection with the receptacle. In certain embodiments the first arm and the second arm each comprise an open channel. In certain embodiments the transfer conduit is disposed below the receptacle and extends to one side thereof.

In certain embodiments the apparatus further includes a burner within the combustion chamber, the receptacle and flue tube being disposed above the burner and in substantial alignment therewith when in use.

In a second aspect, embodiments are disclosed of apparatus for heating and storing liquid, the apparatus comprising: a liquid storage tank a combustion chamber adjacent a lower end of the liquid storage tank, a flue having an entry and an exit end, the flue being disposed above the combustion chamber and in fluid communication therewith, a condensate collector at least partially disposed within the combustion chamber, the condensate collector including a receptacle in the region of the entry end of the flue, a discharge outlet in fluid communication with the receptacle and being operatively connected to a drain external of the combustion chamber.

In certain embodiments the condensate collector may be as described earlier in either its broad or more narrow form.

BRIEF DESCRIPTION OF THE DRAWINGS

Notwithstanding any other forms which may fall within the scope of the method and apparatus set forth in the summary, specific embodiments of the method and apparatus will now be described by the way of example and with reference to the accompanying drawing in which.

DETAILED DESCRIPTION

Figure 1:
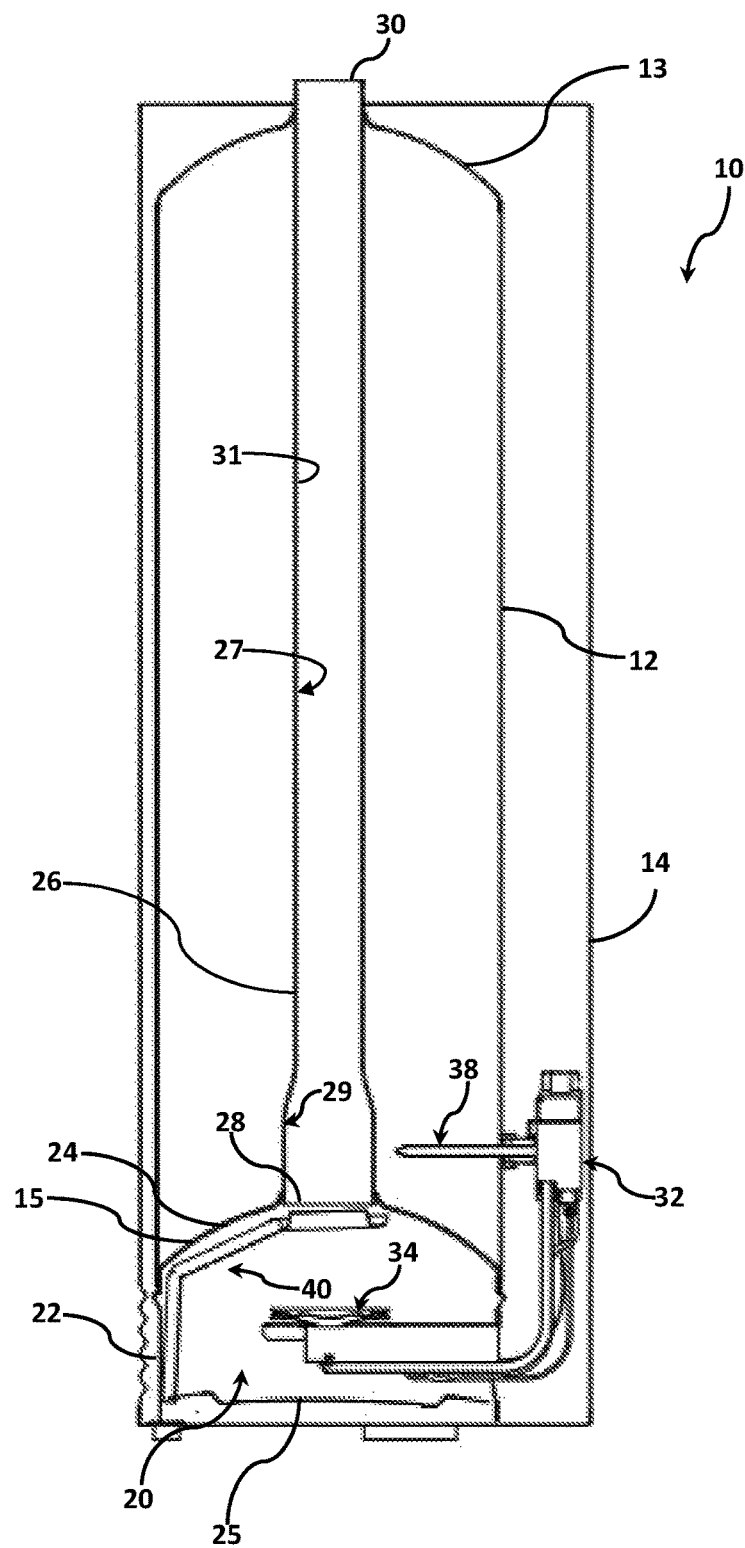
FIG. 1 is a schematic sectional view of a gas water heater according to one embodiment.

Referring to FIG. 1 there is illustrated a gas water heater apparatus 10. The apparatus 10 includes a storage tank 12 in which water to be heated is held. The tank 12 is generally elongated in form and has an upper end 13 and a lower end 15. In its operating position the tank 12 is arranged in a generally upright orientation. The apparatus further includes an outer wall or jacket 14 which substantially surrounds the tank 12 and is spaced therefrom.

The apparatus further includes a combustion chamber 20 which is disposed below the tank 12. The combustion chamber 20 comprises a side wall 22, a bottom wall 23 and an upper wall 24 which is of domed shape and immediately adjacent the tank 12. The upper wall 24 has an opening 17 therein through which combustion gases can be expelled from the combustion chamber 20. As shown the upper wall 24 may form the lower wall of the tank 12. A flue tube 26 extends through the tank 12 and has an entry end 28 at the combustion chamber 20 and an exit end 30 remote from the combustion chamber 20. Combustion gases are caused to pass from the combustion chamber 20, the outlet 17 and through the flue tube 26 out of the exit end 30 and thereafter discharged appropriately.

The apparatus further includes a gas burner 34 within the combustion chamber 20. As shown, the gas burner 34 is arranged below and in axial alignment with the flue tube 26. A gas controller 32 and temperature sensor 38 are also provided.

Figure 2:
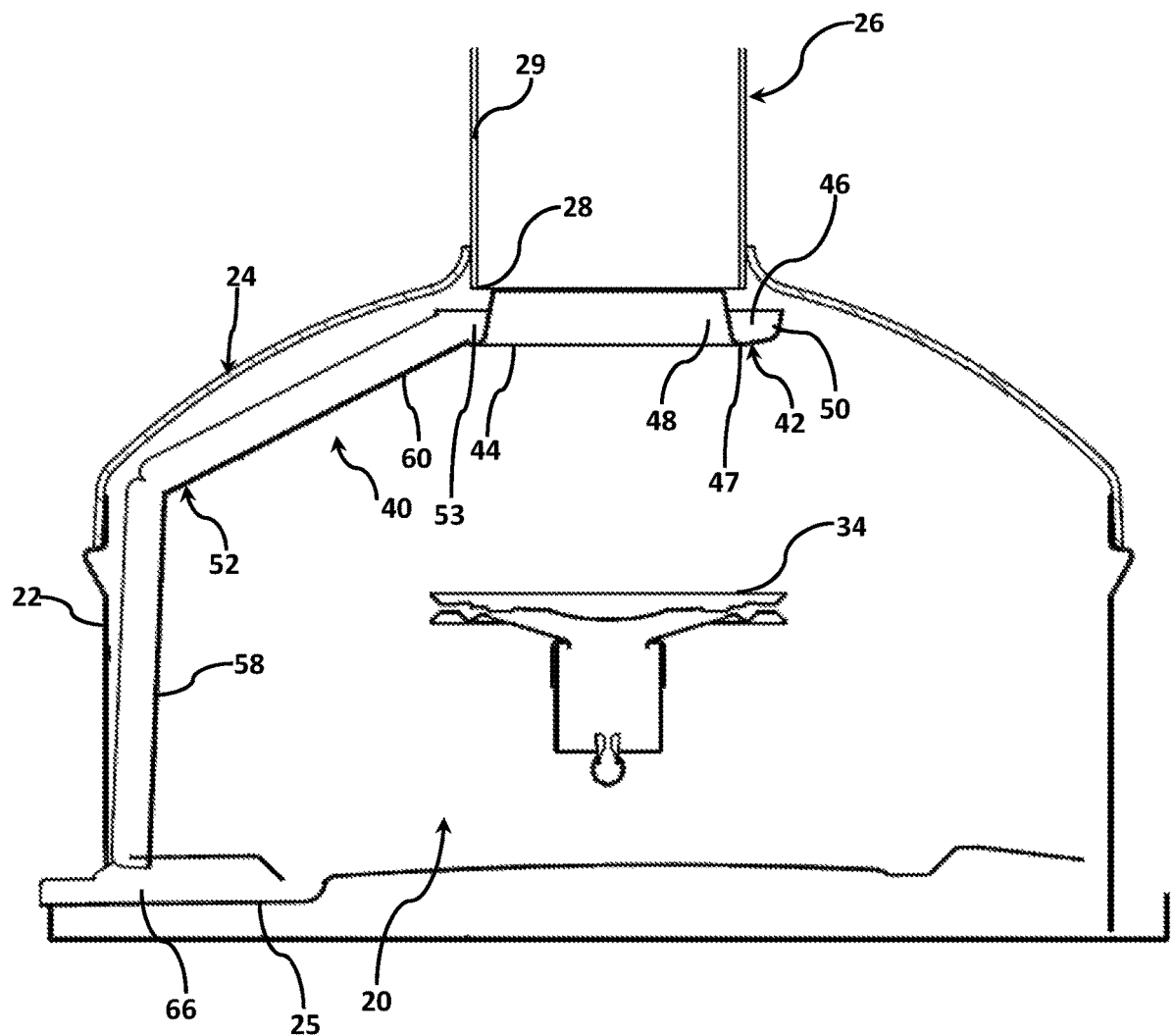
FIG. 2 is a schematic sectional view of part of a gas water heater according to one embodiment.
Figure 3:
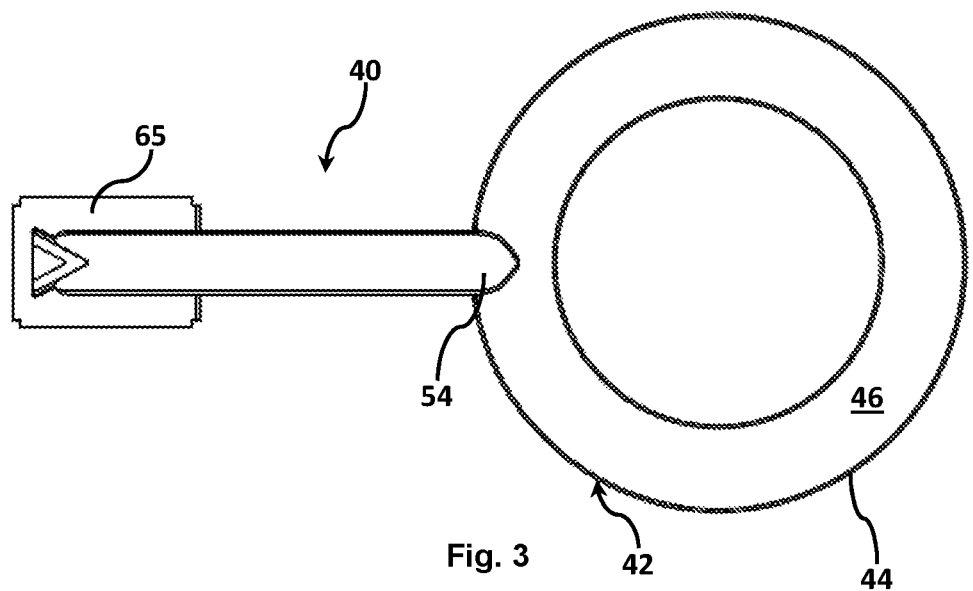
FIG. 3 is a schematic plan view of a conduit collector according to one embodiment.
Figure 4:
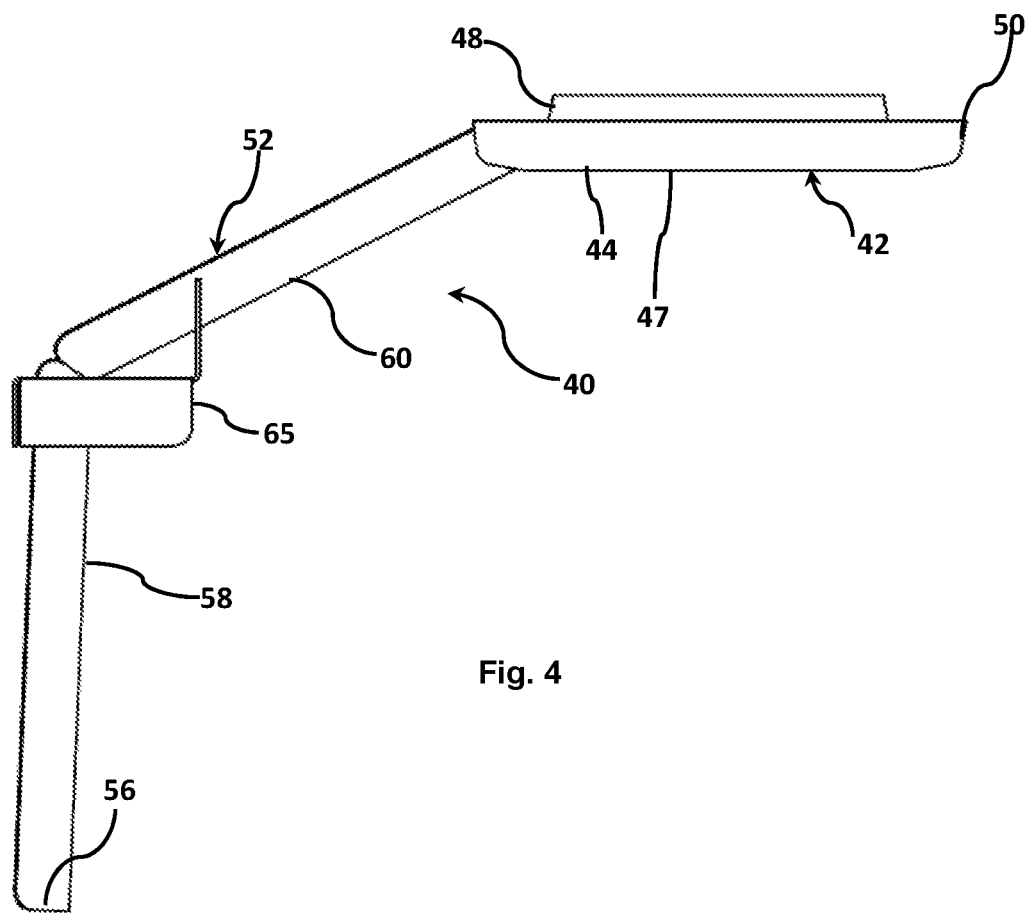
FIG. 4 is a side elevation of the conduit collector shown in FIG. 3.
Figure 5:
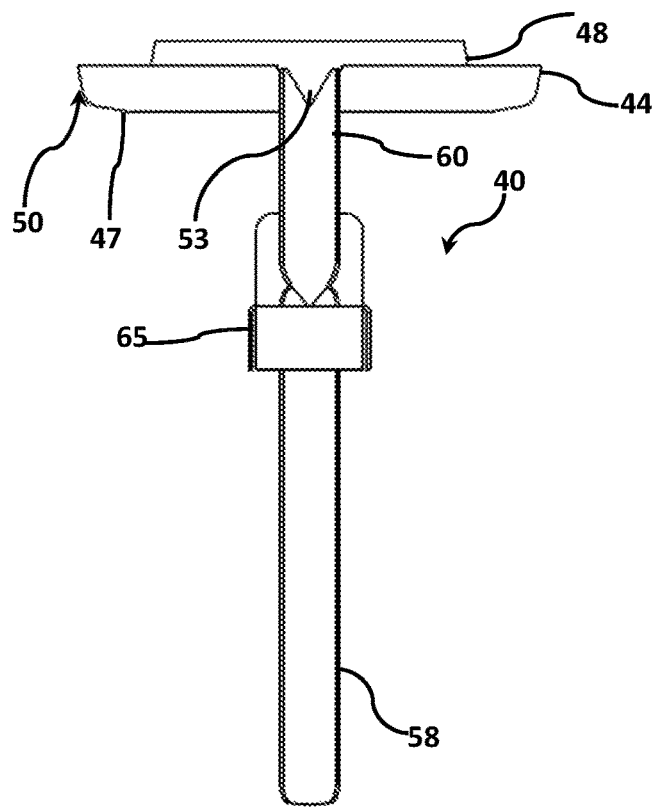
FIG. 5 is an end elevation of the conduit collector shown in FIGS. 3 and 4 viewed from one end.
Figure 6:
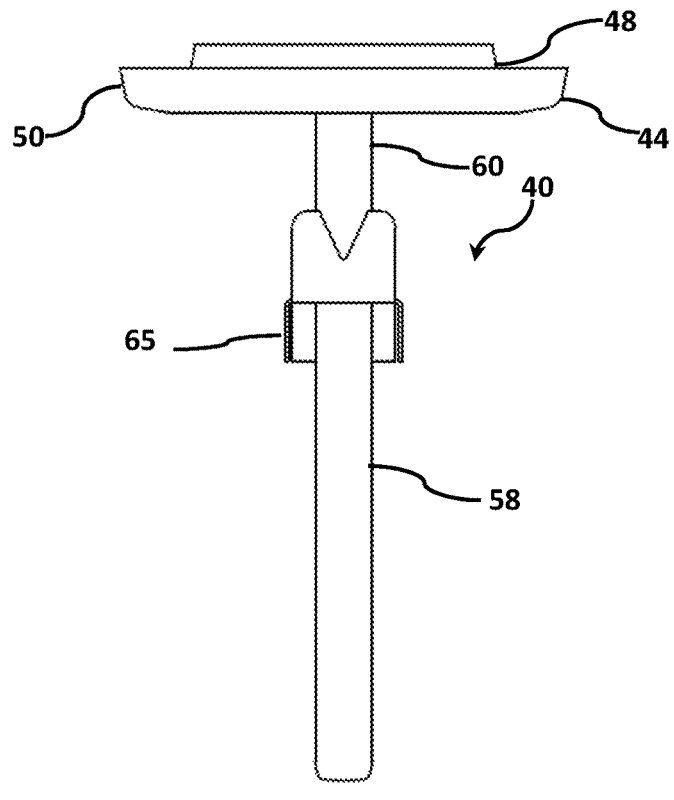
FIG. 6 is an end elevation of the conduit collector shown in FIGS. 3 to 5 viewed from the other end.

FIG. 2 illustrates apparatus according to one embodiment. The same reference numerals as used in FIG. 1 have been used to identify like parts in FIG. 2. As shown in FIG. 2 the flue tube 26 has a flue side wall 25 which has an inner side wall surface 27 which includes an inner end section 29 at the entry end 28 and a main section 31 downstream thereof. The section 29 is of greater cross-sectional dimension than section 31. The inner side wall surface 27 has a tapered section 21 between the main section 31 and the inner end section 29. The angle of inclination of the tapered section 21 can be such that condensate tends to form on the inner surface 27 and maintain contact therewith as it travels along it towards the entry end 28 without separating from the inner surface at any region.

As shown, the apparatus 10 includes a condensate collector 40 which, in some embodiments, is disposed within the combustion chamber 20, in an installed position. As best illustrated in FIGS. 3 to 6 the condensate collector 40 includes a receptacle 42 which, in the form shown comprises a generally annular shaped channel 44 having a base wall 47, an inner side wall 48, an outer peripheral side wall 50, and an open top side 46. As shown, when in use the receptacle 42 is positioned immediately adjacent the entry end 28 of the flue tube 26 and is sized so that the open side 46 substantially aligns with the inner surface 29 of the entry end 28 of the flue tube 26. Thus, during operation of the apparatus any condensate produced which tends to form on the inner surface 29 of the flue tube and will flow into the receptacle 42.

As shown in FIG. 2, the inner side wall 48 has a height from the base wall 47 to the open top side 46 which is greater than the height of the outer peripheral side wall 50. This difference in height is a preference, and the walls 48 and 50 could be the same height, or wall 50 larger than wall 48. As shown, the inner side wall 48 can be immediately located at the entry end of the flue tube 26 or extend partially into the tube. As shown, the inner side wall 48 has a cross-sectional dimension which is less than the cross-sectional dimension of the inner surface 29 of the flue tube 26 at the entry end 28 and further, the cross sectional dimension of the outer peripheral side wall 50 is greater than the cross-sectional dimension of the inner surface 29 of the flue tube 26 at the entry end 28 thereof. Thus, the inner surface 29 of the entry end 28 of the flue tube 26 is substantially aligned directly above the open top side 46 of the channel 44. As such any condensate formed on the inner surface 29 during operation of the apparatus can flow directly into the receptacle. As shown, the cross-sectional dimension of the outer peripheral sidewall 50 is equal to or greater than the cross-sectional dimension of the main section 31 of the inner surface of the flue tube 26. Preferably all cross-sectional dimensions referred to are circular.

The configuration of the annular shaped channel 44 ensures that there is a clear passage maintained for the flow of combustion gases from the burner 34 to the flue tube 26. That is to say, the annular channel 44 does not substantially inhibit this flow. This is assisted by the diameter of the aperture through the annular shaped channel 44 being sized so as to be the same as or larger than the diameter of the main section 31 of flue tube 26.

The condensate collector 40 further includes a discharge outlet 53 from which condensate collected in the receptacle 42 can be discharged. The collector further includes a transfer conduit 52 which comprises a first arm 58 mounted to the side wall of the combustion chamber by a mounting bracket 65 (FIGS. 4 to 6) and a second arm 60, the arms being arranged end to end with the second arm 60 extending to the receptacle 42. Thus, the receptacle is held in a cantilevered configuration in position by the second arm 60. This is best illustrated in FIG. 2. The transfer conduit 52 is arranged in close proximity to the walls of the combustion chamber 20 and does not to a significant extent encroach into the main region of the combustion chamber. That is to say, the combustion chamber remains substantially unobstructed. As shown, the first arm 58 and the second arm 60 comprise open sided channels, which in the form shown are V-shaped.

As will be readily understood, the transfer conduit 52 can be manufactured in a single piece instead of having two arms 58 and 60, or depending upon the shape of the combustion chamber, it may be assembled from more than two pieces.

In use, the burner 34 is ignited so as to heat the water within the tank 12. The combustion gases produced in the combustion chamber 20 flow through the flue tube 26. Condensate formed tends to mostly occur on the inner surface of the flue tube 26. The condensate tends to flow towards the entry end 28 passing out of the tube into the channel 44. From the channel 44 any collected conduit passes through the transfer conduit 52 and into the drain.

Figure 7:
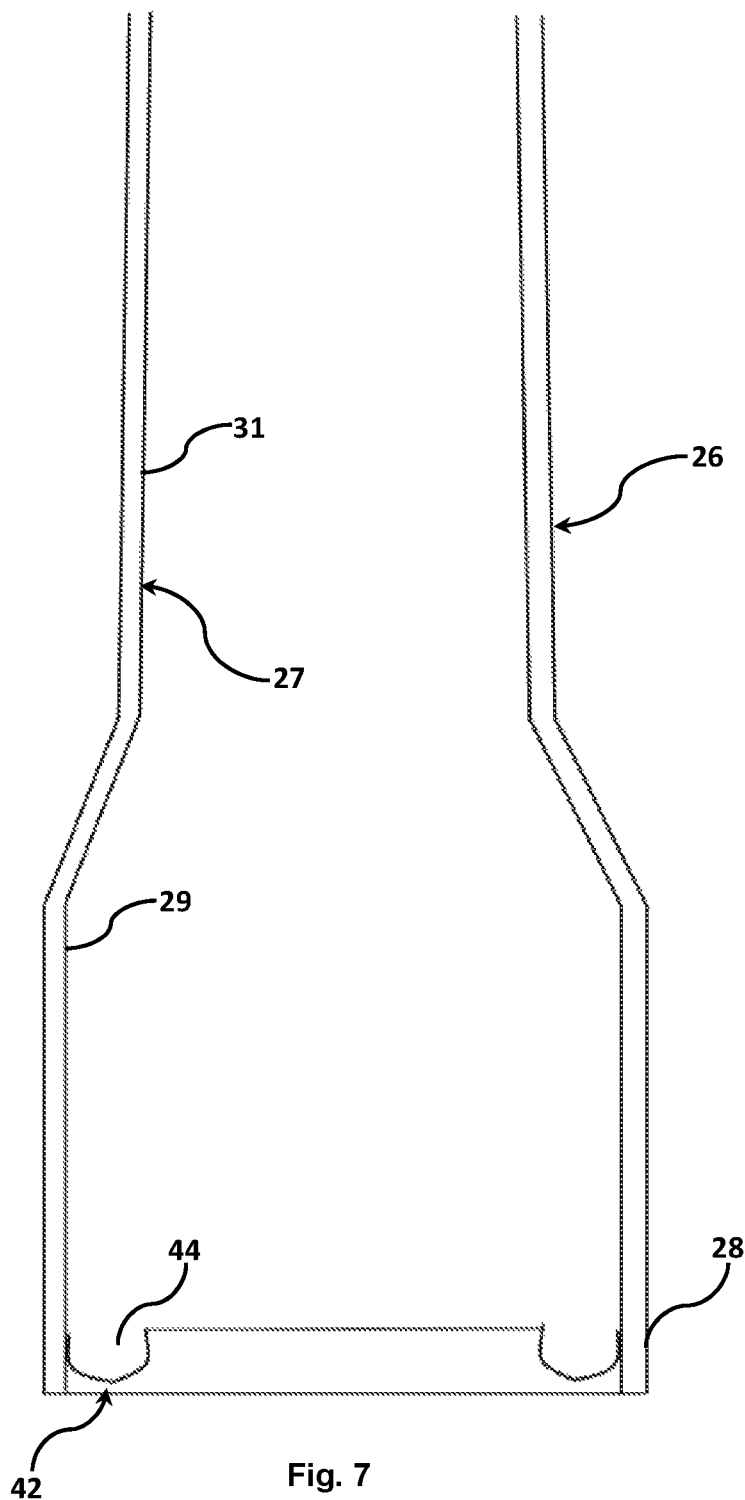
FIG. 7 is a schematic view of apparatus according to another embodiment.

In the embodiment shown in FIG. 7, the channel 44 is positioned within the flue tube 26 at the entry end 28 thereof. The outer peripheral side wall 50 of the channel 44 may be secured to the inner surface 29. This may be effected in any suitable fashion such as welding by the use of suitable fasteners. The channel 44 can have a discharge outlet which can be connected to a transfer conduit 52 in a similar fashion so that shown in FIGS. 2 to 6.

Figure 8:
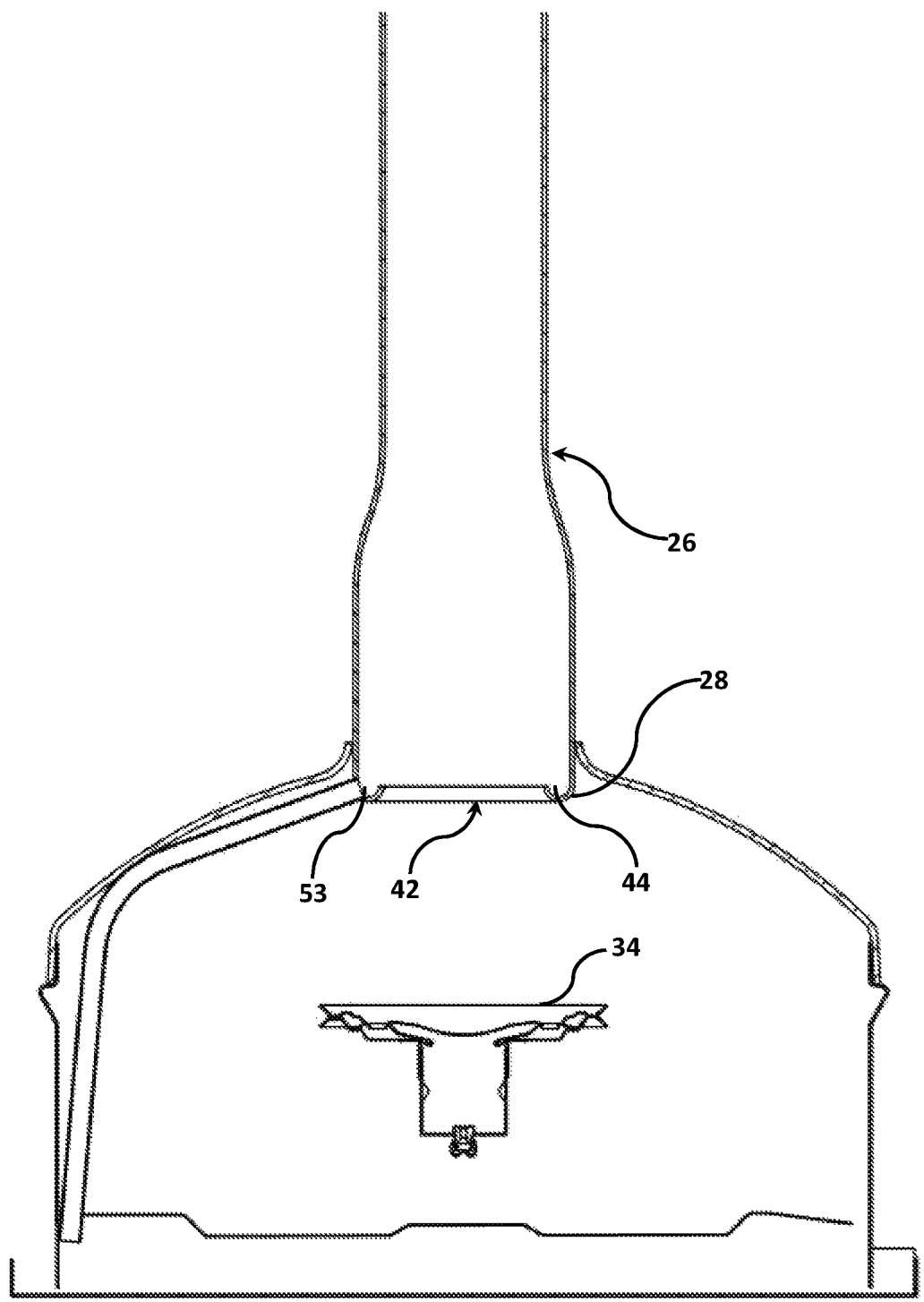
FIG. 8 is a schematic sectional view of apparatus according to yet another embodiment.

In the embodiment of FIG. 8 the entry end 28 extends into the combustion chamber 20. In this embodiment the side wall of the flue tube 26 is configured so as to provide for the channel 44. As shown the edge section of the side wall is extended inwardly and upwardly towards the exit end of the flue tube hereby providing for the channel 44.

Figure 9:
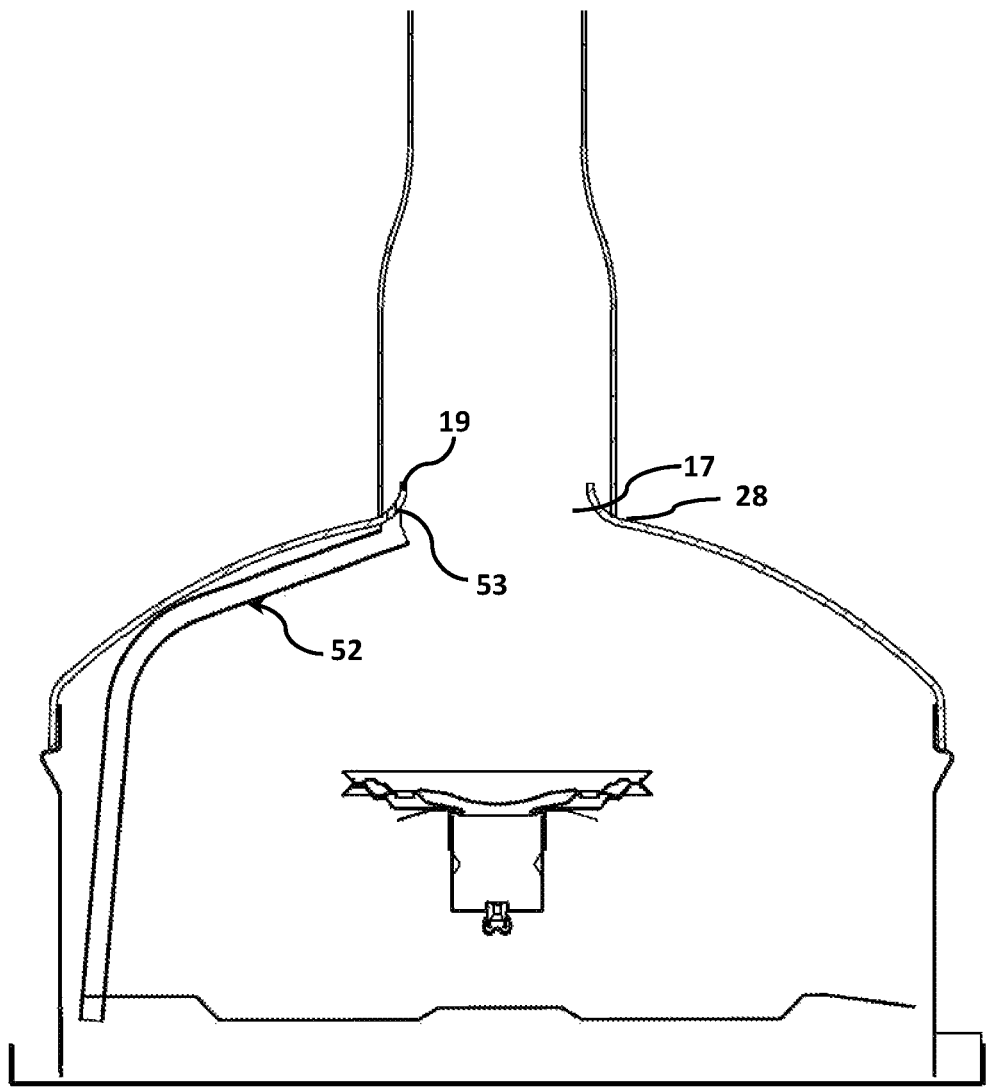
FIG. 9 is a schematic sectional view of apparatus according to yet another embodiment.

In the embodiment of FIG. 9 the entry end 28 of the flue tube 26 and the upper wall 24 of the combustion chamber 20 are configured to provide for the channel 44. To this end the upper wall 24 has an opening 17 therein for the passage of combustion gases. The opening 17 has an upwardly turned lip 19. The edge of the entry end 28 overlies the opening such that there is a space between the flue side wall and the lip 19 thereby forming the channel 44. A discharge outlet 53 provides fluid communication between the channel 44 and the transfer conduit 52.

Figure 10:
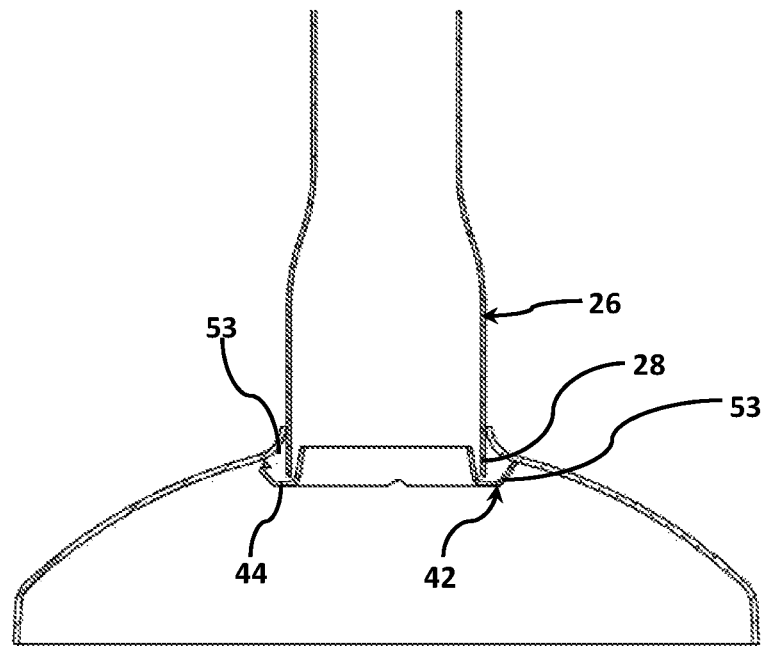
FIG. 10 is a schematic sectional view of apparatus according to yet another embodiment; and, FIG. 11 is an underside view of the apparatus shown in FIG. 10.
Figure 11:
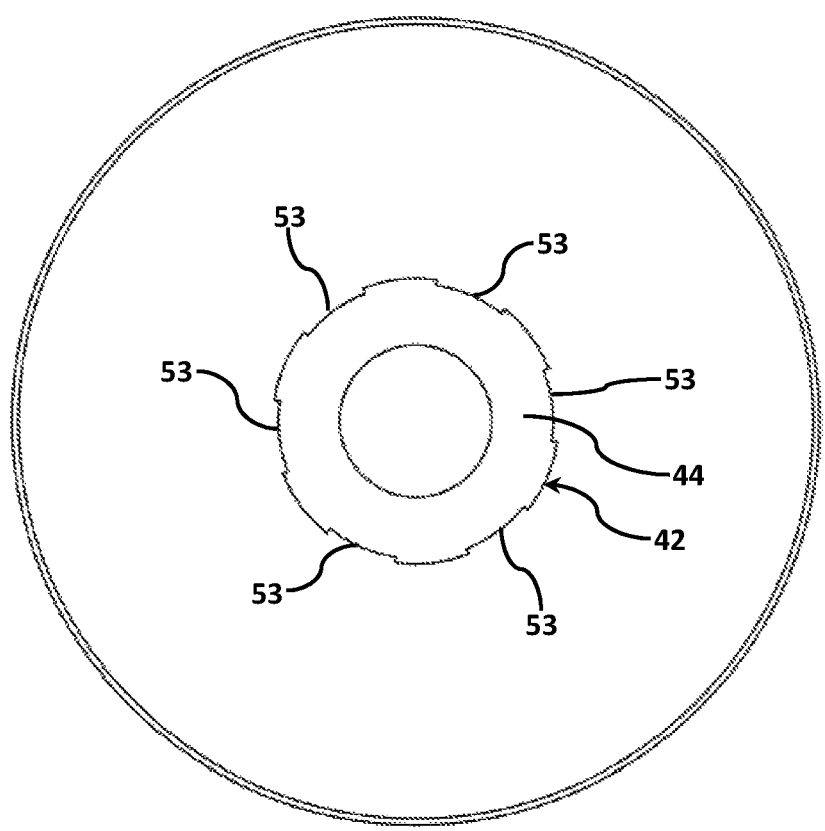

In the embodiment of FIGS. 10 and 11 the entry end 28 of the flue tube 26 extends into the combustion chamber. In this embodiment the outer peripheral wall 50 is secured to the inner surface of the upper wall 24 of the combustion chamber 20. As shown the entry end 28 of the flue tube 26 is within the channel 44. The upper edger of the peripheral wall 50 has a number of slots therein which define a plurality of discharge outlets 53. In operation the channel 44 fills with condensate from the flue tube 26 which then passes out of the outlets 53 and is caused to travel along the inner surface of the walls of the combustion chamber until it reaches the bottom wherefrom it is discharges to a drain.

While the transfer conduit 52 is described above as being made from one or more open channel or v-shaped sections, it will be readily understood that the transfer conduit 52 can instead be manufactured from tubular sections. It is expected however, that open channel or v-shaped sections will not be readily blocked, whereas there may be a risk of tubular section becoming blocked over time.

As will be appreciated the condensate collector in its various forms described above may be retrofitted to existing heating and storage systems.

In the forgoing description of preferred embodiments, specific terminology has been resorted to for the sake of clarity. However, the invention is not intended to be limited to specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, addition and/or changes can be made thereto without departing from the scope and spirit of the disclosed embodiments, the embodiments being illustrative and not restrictive.

Furthermore, invention(s) have been describe in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g. aspects of one embodiment may be combined with aspects of another embodiment to realise yet other embodiments. Further, each independent feature or component of any given assembly may constitute an additional embodiment.

The reference numerals in the following claims do not in any way limit the scope of the respective claims.

| TABLE OF PARTS | |
|---|---|
| Item | Part |
| 10 | Apparatus |
| 12 | Liquid storage tank |
| 13 | Upper end |
| 14 | Outer wall or jacket |
| 15 | Lower end |
| 19 | Lip |
| 20 | Combustion chamber |
| 21 | Tapered flue section |
| 22 | Side wall |
| 23 | Bottom wall |
| 24 | Upper wall |
| 25 | Flue side wall |
| 26 | Flue tube |
| 27 | Inner surface |
| 28 | Entry end |
| 29 | Inner end section |
| 30 | Exit end |
| 31 | Main section |
| 32 | Gas controller |
| 34 | Burner |
| 38 | Temperature sensor |
| 40 | Condensate collector |
| 42 | Receptacle |
| 44 | Channel |
| 46 | Open side |
| 47 | Base |
| 48 | Inner side wall |
| 50 | Outer peripheral side wall |
| 52 | Transfer conduit |
| 53 | Discharge outlet |
| 54 | Inlet end |
| 56 | Outlet end |
| 58 | First arm |
| 60 | Second arm |
| 66 | Drain channel |

The invention claimed is:

1. A condensate collector suitable for use in apparatus for heating and storing liquid, the apparatus comprising:
   a liquid storage tank,
   a combustion chamber adjacent a lower end of the liquid storage tank, and
   a flue having a flue side wall, an entry end and an exit end, the flue being disposed above the combustion chamber and in fluid communication therewith,
   wherein the condensate collector comprises:
      a receptacle in the region of the entry end of the flue comprising a generally annular shaped channel having a base, an inner side wall, an outer peripheral side wall and an open top side, wherein the channel is positioned within the flue at the entry end thereof, the top side of the channel facing toward the exit end of the flue, and
      a discharge outlet for discharging condensate collected in the receptacle for subsequent transfer to a drain.

2. The condensate collector according to claim 1 wherein the flue side wall of the flue at the entry end is configured to provide for the channel.

3. The condensate collector according to claim 1 wherein the channel is positioned adjacent the entry end of the flue when installed.

4. The condensate collector according to claim 3, wherein the inner side wall has a height from the base to the top side which is greater than that of the outer peripheral side wall.

5. The condensate collector according to claim 3, wherein the flue side wall includes an inner side surface section at the entry end, and the open top side is substantially aligned with the inner side surface section.

6. The condensate collector according to claim 3, wherein the collector further includes a mounting bracket for mounting the collector within the combustion chamber when installed.

7. The condensate collector according to claim 1, further including a transfer conduit having one end operatively connected to the discharge outlet and the other end operatively connected to a drain.

8. The condensate collector according to claim 7, wherein the transfer conduit comprises a first arm and a second arm arranged end to end, the first arm being disposed adjacent a side wall of the combustion chamber when installed and being operatively connected to the drain and the second arm extending from the first arm and being operatively connected to the discharge outlet, wherein the first and second arms comprise an open channel, and wherein, in use, the transfer conduit is optionally disposed below the receptacle and extends to one side thereof.

9. The condensate collector according to claim 1, wherein the apparatus further includes a burner within the combustion chamber, the receptacle and flue being disposed above the burner and in substantial alignment therewith.

10. An apparatus for heating and storing liquid, the apparatus comprising:
a liquid storage tank,
a combustion chamber adjacent a lower end of the liquid storage tank,
a flue having a flue side wall, an entry end and an exit end, the flue being disposed above the combustion chamber and in fluid communication therewith, and a condensate collector disposed at least partly within the combustion chamber,
wherein the condensate collector comprises:
a receptacle which is in the region of the entry end of the flue comprising a generally annular shaped channel having a base, an inner side wall, an outer peripheral side wall and an open top side, wherein the inner side wall has a height from the base to the top side which is greater than that of the outer side wall, and
a discharge outlet for discharging condensate collected in the receptacle for subsequent transfer to a drain.

11. The apparatus according to claim 10, wherein when in use the open top side is disposed adjacent the entry end of the flue, the flue side wall includes an inner side surface section at the entry end, and the open top side being substantially aligned with the inner side surface.

12. The apparatus according to claim 10, wherein the condensate collector further includes a mounting bracket for mounting the collector within the combustion chamber when in use.

13. The apparatus according to claim 10, further including a transfer conduit having one end operatively connected to the discharge outlet and the other end operatively connected to a drain.

14. The apparatus according to claim 13, wherein the transfer conduit comprises a first arm and a second arm arranged end to end, the first arm being disposed adjacent a side wall of the combustion chamber when in use and being operatively connected to the drain and the second arm extending from the first arm and being in operative connection with the discharge outlet, wherein the first and second arms optionally comprises an open channel.

15. The apparatus according to claim 13, wherein, in use, the transfer conduit is disposed below the receptacle and extends to one side thereof.

16. The apparatus according to claim 10, wherein the apparatus further includes a burner within the combustion chamber, the receptacle and flue being disposed above the burner and in substantial alignment therewith.

17. A condensate collector suitable for use in apparatus for heating and storing liquid, the apparatus comprising:
a liquid storage tank;
a combustion chamber adjacent a lower end of the liquid storage tank;
a flue having a flue side wall, an entry end and an exit end, the flue being disposed above the combustion chamber and in fluid communication therewith,
wherein the condensate collector comprises:
a receptacle in the region of the entry end of the flue comprising a generally annular shaped channel having a base, an inner side wall, an outer peripheral side wall and an open top side,
wherein the channel is positioned adjacent the entry end of the flue when installed, and
wherein the inner side wall has a height from the base to the top side which is greater than that of the outer peripheral side wall; and
a discharge outlet for discharging condensate collected in the receptacle for subsequent transfer to a drain.

18. An apparatus for heating and storing liquid, the apparatus comprising:
a liquid storage tank,
a combustion chamber adjacent a lower end of the liquid storage tank,
a flue having a flue side wall, an entry end and an exit end, the flue being disposed above the combustion chamber and in fluid communication therewith, and
a condensate collector disposed at least partly within the combustion chamber,
wherein the condensate collector comprises:
a receptacle which is in the region of the entry end of the flue,
a discharge outlet for discharging condensate collected in the receptacle for subsequent transfer to a drain, and
a transfer conduit having one end operatively connected to the discharge outlet and the other end operatively connected to a drain.

19. The apparatus according to claim 18, wherein the transfer conduit comprises a first arm and a second arm arranged end to end, the first arm being disposed adjacent a side wall of the combustion chamber when in use and being operatively connected to the drain and the second arm extending from the first arm and being in operative connection with the discharge outlet, wherein the first and second arms comprises an open channel.

20. The apparatus according to claim 18, wherein, in use, the transfer conduit is disposed below the receptacle and extends to one side thereof.

\* \* \* \* \*